Dec. 13, 1949 W. A. HAGERBAUMER 2,491,446
DISTRIBUTION OF SOLIDS TO MOVING
COMPACT BEDS THEREOF
Filed May 8, 1946 2 Sheets-Sheet 1
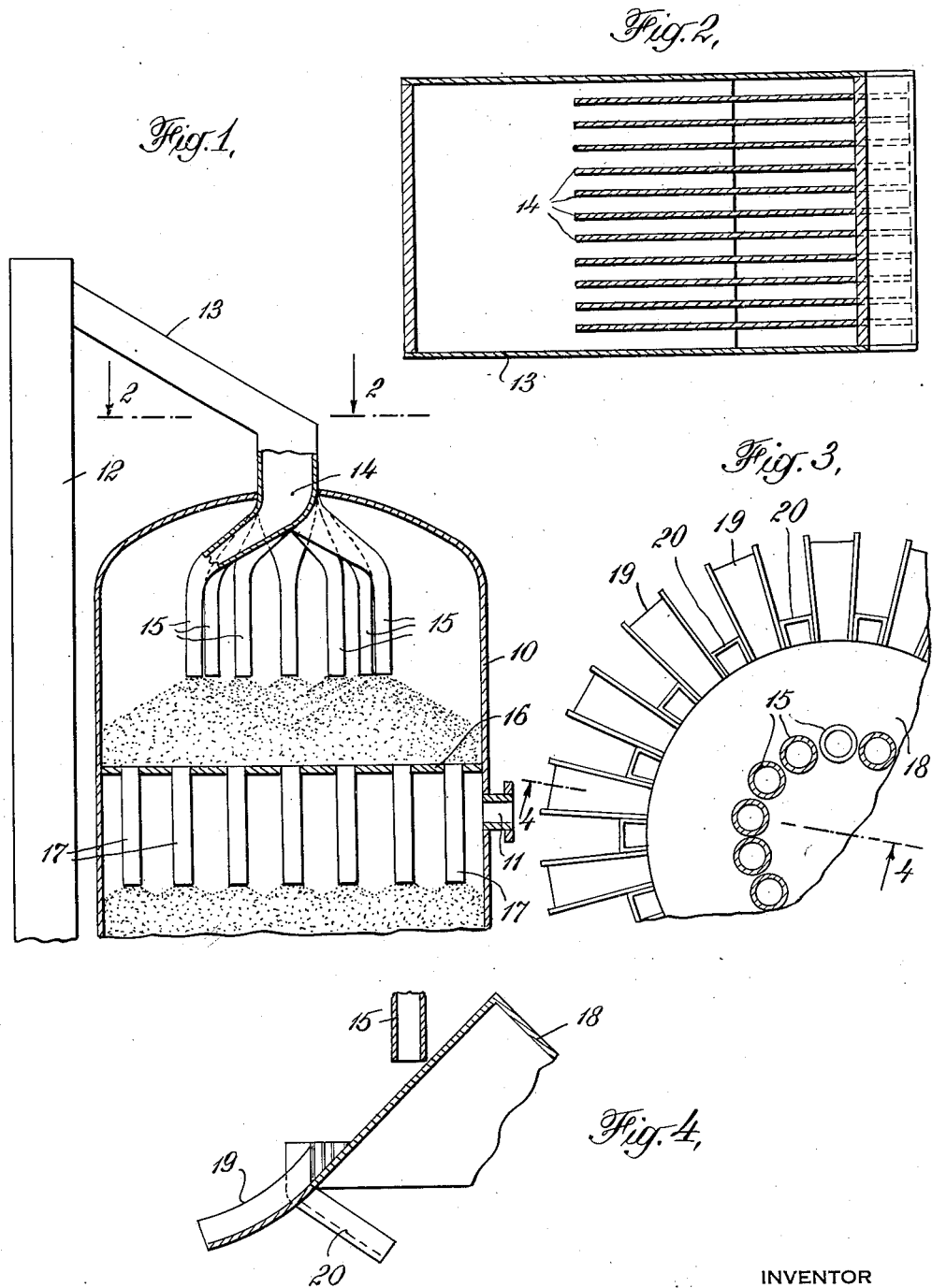
INVENTOR
WILLIAM A. HAGERBAUMER
BY
Oswald G. Hayes
ATTORNEY Dec. 13, 1949 W. A. HAGERBAUMER 2,491,446
DISTRIBUTION OF SOLIDS TO MOVING
COMPACT BEDS THEREOF
Filed May 8, 1946 2 Sheets-Sheet 2
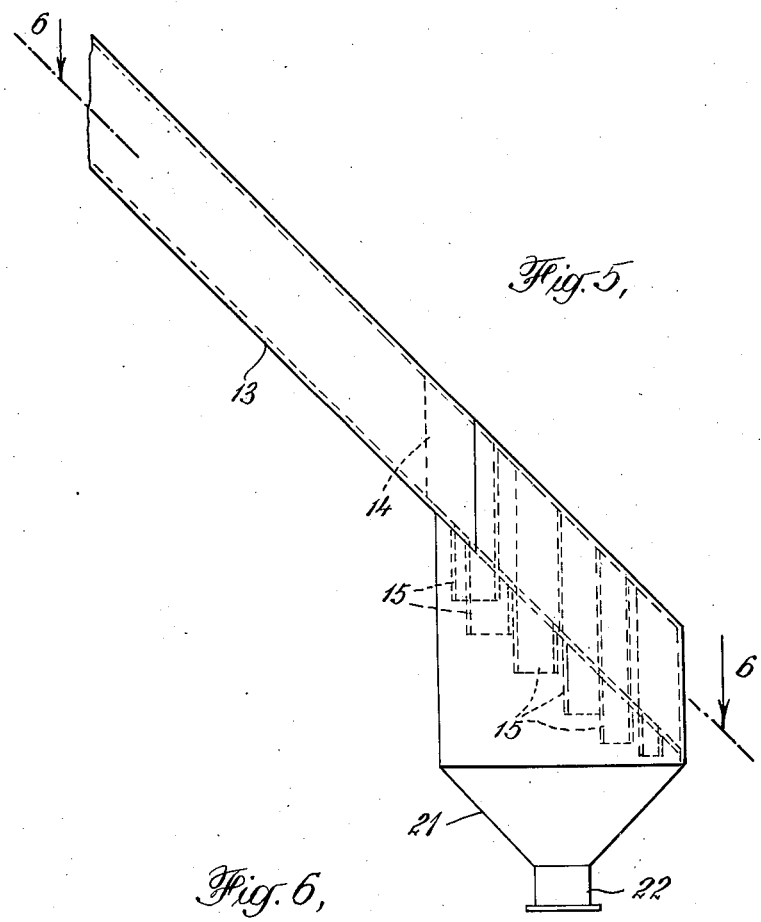
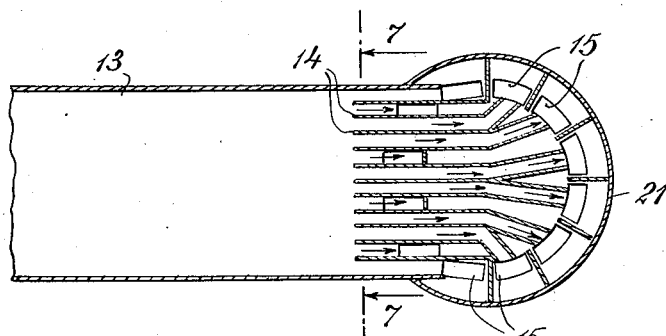
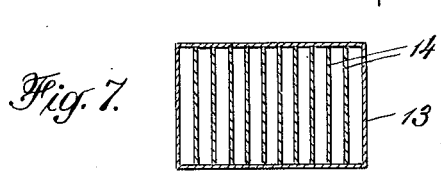
INVENTOR
WILLIAM H. HAGERBAUMER
BY
ATTORNEY

Patented Dec. 13, 1949  2,491,446

UNITED STATES PATENT OFFICE 2,491,446

DISTRIBUTION OF SOLIDS TO MOVING COMPACT BEDS THEREOF

William A. Hagerbaumer, Westfield, N. J., assignor to Socony-Vacuum Oil Company, Incorporated, a corporation of New York Application May 8, 1946, Serial No. 668,211

7 Claims. (Cl. 23—1)

1

This invention relates to method and apparatus for achieving uniform size distribution in a moving bed of solids from a source of supply spaced above and to one side of the center of the bed.

A number of modern processes utilize a compact moving bed of granular solids, usually for contact with a fluid medium. For example, catalytic cracking of hydrocarbons is conducted by moving a compact mass of granular solid downwardly through a reaction zone and a regeneration zone in series. The catalyst is delivered to the top of a contacting vessel from an elevator which is necessarily spaced to one side of the vessel. The granular catalyst is then fed downwardly through a sloping delivery line to the top of the contact vessel. The normal condition of catalyst as used commercially includes particles of varying sizes within a predetermined size range. If the granules were of uniform size and shape no difficulty would be encountered by reason of a sloping feed inlet, but as a practical matter the size of the particles does vary to a substantial extent.

As the granules pass downwardly in a sloping supply line, they tend to classify with the smaller particles on the bottom and the larger particles on the top of the stream of granules supplied. When this classified stream is fed to the top of the contact vessel, the fines are found on one side of the vessel and the larger particles on the other side. Flow characteristics of a fluid medium passing through the bed of granular solids vary with particle size and the contacting time will differ between the two sides of the bed due to classification of the granules in the feed line. This result is to be avoided, particularly in gas and solid contacting operations involving a temperature change.

An example of operation in which particle size variations seriously affect operating characteristics is the short time high temperature cracking of hydrocarbons to produce ethylene by contacting the charge with a highly heated granular solid. Due to the fact that secondary reactions in the nature of condensation to aromatics follows rapidly after cracking of such materials as gas oil at 1500° F., the reaction time must be carefully limited (e. g., 0.2 second) to obtain good yields. Where the rate of flow varies in different parts of the bed due to different particle size, control is limited to obtaining a suitable mean value as contrasted with the optimum contact time in all portions of the bed.

Where temperature changes are involved, as

2 in contacting a cold charge with a hot solid, adverse effects of size differences are exaggerated by reason of the fact that the gas supplied will reach a lower maximum temperature in the regions of more rapid flow thus inducing still greater flow by reason of the fact that the gases do not expand as greatly in these regions of rapid flow.

According to the present invention, these adverse results are overcome by dividing the stream supplied to the top of the vessel in a manner to have substantially the same size distribution in each of the several portions of the stream and supplying the separate portions uniformly about the top of the moving bed in the contacting vessel. According to the invention, the solids are flowed through a flat bottomed conduit and are then split vertically into a plurality of independent streams. It will be seen that this result can be achieved only in a flat bottomed conduit having vertical side walls since it is only thus that a stream of uniform size distribution across its width can be obtained. The separate streams so produced are separately introduced at uniformly spaced points across the top of the moving bed in the contacting vessel.

The introduction of the separate streams may be made by a plurality of inlets opening directly to the top of the bed. The number of inlets may be reduced while still obtaining the desired results of this invention by supplying the separate streams to uniformly spaced points around a conical spreader above the moving bed in the contacting vessel. As a further embodiment of the invention, the discharge from the bottom of the conical spreader may be diverted uniformly under and away from the spreader itself by means of a ring of spouts at the bottom of the spreader alternately directed inwardly and outwardly from the bottom edge thereof.

These and other objects of the invention will be apparent from the detailed description of preferred embodiments thereof shown in the annexed drawings; wherein Figure 1 is a partial elevation, in partial section showing the top of a contacting vessel together with the feed conduit for supplying solids thereto;

Figure 2 is a section on line 2—2 of Figure 1;

Figure 3 is a fragmentary plan of a conical spreader;

Figure 4 is a fragmentary section on line 4—4 of Figure 3;

Figure 5 is a side elevation of another embodiment of the invention;

Figure 6 is a section on line 6—6 of Figure 5; and

Figure 7 is a section on line 7—7 of Figure 6.

In Figure 1, a contacting vessel is indicated generally at 10 and is adapted to contain a downwardly moving compact column of granular solid material, through which a gaseous medium is passed upwardly, in generally countercurrent direct contact with the solid, and removed at outlet 11. Granular solid is recycled in the system by an elevator 12 from which it is passed to a sloping conduit 13 feeding the top of contactor 10.

As the granular solids move downwardly through the sloping conduit 13, classification occurs with settling of the finer particles to the bottom of the conduit. When the recycled solid is dropped directly into the top of contactor 10, the fine material will be on the side nearest the elevator with coarser material on the opposite side, thus producing substantial difference in flow characteristics across the contactor.

This result is substantially inhibited according to the present invention by providing the conduit 13 with a flat bottomed surface to thus give a stream of constant width having a uniform solids distribution horizontally but varying in a constant manner vertically. This primary stream is split into a plurality of secondary streams by vertical partitions 14. Each of the secondary streams will thus have the same size distribution as does the primary stream. In other words, each of the secondary streams is substantially equivalent to each of the others with respect to percentage of granules in each size range.

The several secondary streams are maintained independent and separately transferred to points across the top of the contactor as by conduits 15, each of which communicates with one of the small channels produced by the vertical partitions 14. According to the embodiment shown in Figure 1, the contactor is circular in cross section and the secondary conduits 15 are arranged in a circle with their discharge ends uniformly spaced across a level of the contactor above the portion of the contactor in which the contacting operation is carried out. The several conduits 15 discharge onto a bulk supply of granular solid above a plate 16 thus providing a hopper of granular solid in which variations of size distribution are extremely minor. A number of feed pipes 17 depend from the plate 16 to supply the granular solid to a moving bed in the contacting portion of contactor 10. Countercurrently moving gases are disengaged from the upper surface of the bed in the open space among feed pipes 17 and are withdrawn therefrom by outlet 11.

A still further modification of the invention is illustrated by Figures 3 and 4 which provide means for a wider distribution of separate streams. The number of separate streams that can be drawn from conduit 13 is limited by the width of the conduit 13 and the average particle size of the granular solid employed. For example, in a contacting process using solid granules of about 0.3 inch average diameter, the space between vertical partitions 14 must be about 2 inches in order to avoid clogging. Assuming that reasonable stream depth in the conduit 13 so limits the width thereof that only 12 secondary streams can be drawn from the conduit 13, it is often found desirable to further divide each of these separate streams to give a wider distribution of the granular solid across the top of the contact bed. This may be done by distributing the outlets of the secondary conduits 15 uniformly around a conical divider 18 which has subdividing troughs of two types at its lower edge. Half of the troughs are directed outwardly, numeral 19 on the drawings, and the other half are directed inwardly, numeral 20 on the drawings.

The uniform spacing of the conduits 15 about the periphery of the conical divider 18 insures a uniform size distribution around the conical divider and any stratification occurring on the surface of the divider is rendered ineffective by splitting the streams through the medium of the several troughs 19 and 20.

The embodiment of Figures 5 to 7 inclusive shows a different arrangement of pipes 15 to convey granular solids from the several channels set up by the dividing partitions 14. This arrangement provides for diverting adjacent streams to different sides of the circle defined by the discharge openings of pipes 15, as does the embodiment of Figure 1. Figure 5 also shows a different manner of conveying the streams of solids from the several pipes 15 to the moving bed in which they are to be utilized. As shown in Figure 5, the several pipes 15 discharge into a hopper 21 from which a vertical outlet pipe 22 conveys the solids without reclassification to a suitable contacting chamber. It will be understood of course that the discharge from pipes 15 under the arrangement of Figure 5 may be handled as shown in Figure 1 or, preferably, in accordance with Figures 3 and 4.

I claim:

1. In combination, a vertical vessel arranged for downward movement of a compact bed of granular solid therethrough, and means to supply said solid comprising a flat bottom primary conduit sloping downwardly toward said vessel, a plurality of vertical partitions in said conduit spaced down said conduit and dividing the lower portion of said conduit into a plurality of channels of substantially equal width, a conical divider in the top of said vessel arranged with its apex directed upwardly, a plurality of secondary conduits, each communicating with one of said channels and directed generally downward to said divider, the lower ends of said secondary conduits being spaced equally about said divider and a plurality of diversion troughs arranged about the lower edge of said conical divider to receive granular solid passing downwardly over the surface of said divider, alternate troughs being sloped respectively outwardly from said divider and inwardly under said divider to discharge alternate portions of said solid toward the center and the wall of said vessel.

2. In combination, a vertical vessel arranged for downward movement of a compact bed of granular solid therethrough, and means to supply said solid comprising a flat bottom primary conduit sloping downwardly toward said vessel, a plurality of vertical partitions in said conduit spaced down said conduit and dividing the lower portion of said conduit into a plurality of channels of substantially equal width, a conical divider in the top of said vessel arranged with its apex directed upwardly, and a plurality of secondary conduits, each communicating with one of said channels, and directed generally downward to said divider, the lower ends of said secondary conduits being spaced equally about said divider.

3. In combination, a vertical vessel arranged for downward movement of a compact bed of granular solid therethrough, and means to supply said solid comprising a flat bottom primary conduit sloping downwardly toward said vessel, a plurality of vertical partitions in said conduit spaced down said conduit and dividing the lower portion of said conduit into a plurality of channels of substantially equal width, a conical divider in the top of said vessel arranged with its apex directed upwardly, means to separately transfer streams of solid from said channels and distribute said streams equally about said divider and a plurality of diversion troughs arranged about the lower edge of said conical divider to receive granular solid passing downwardly over the surface of said divider, alternate troughs being sloped respectively outwardly from said divider and inwardly under said divider to discharge alternate portions of said solid toward the center and the wall of said vessel.

4. In combination, a vertical vessel arranged for downward movement of a compact bed of granular solid therethrough, and means to supply said solid comprising a flat bottom primary conduit sloping downwardly toward said vessel, a plurality of vertical partitions in said conduit spaced down said conduit and dividing the lower portion of said conduit into a plurality of channels of substantially equal width, a conical divider in the top of said vessel arranged with its apex directed upwardly, means to separately transfer streams of solid from said channels and distribute said streams equally about said divider.

5. In combination, a vertical vessel arranged for downward movement of a compact bed of granular solid therethrough, and means to supply said solid comprising a flat bottom primary conduit sloping downwardly toward said vessel, a plurality of vertical partitions in said conduit spaced down said conduit and dividing the lower portion of said conduit into a plurality of channels of substantially equal width, and a plurality of secondary conduits, each communicating with one of said channels and directed generally downward into said vessel, the lower discharge ends of said secondary conduits lying in substantially the same horizontal plane and spaced from each other.

6. In combination, a vertical vessel arranged for downward movement of a compact bed of granular solid therethrough, and means to supply said solid comprising a flat bottom primary conduit sloping downwardly toward said vessel, a plurality of vertical partitions in said conduit spaced down said conduit and dividing the lower portion of said conduit into a plurality of channels of substantially equal width, and means to separately convey and discharge said solid from said channels to points spaced from each other in substantially the same horizontal plane within said vessel.

7. A method for distributing granular solid to a compact moving bed thereof from a source of said solid spaced laterally and above said bed which comprises flowing said solid down an inclined surface as a primary stream of granules, confining said primary stream laterally to a substantially constant width, splitting said primary stream on a plurality of planes normal to said surface and parallel to the direction of flow of said solid while still flowing down said inclined surface into a plurality of secondary streams each having substantially the same distribution of sizes of granules as said primary stream, and separately conducting said secondary streams to points spaced from each other across the top of said moving bed.

WILLIAM A. HAGERBAUMER.

REFERENCES CITED

The following references are of record in the file of this patent:

FOREIGN PATENTS

| Number | Country | Date |
|---|---|---|
| 537,305 | Great Britain | June 17, 1941 |